United States Patent
Stackpole et al.

(10) Patent No.: US 10,735,899 B1
(45) Date of Patent: Aug. 4, 2020

(54) ELECTRONIC RADIO FREQUENCY ID (RFID) TRACKER

(71) Applicant: Stackpole & Associates, Inc., Newport, RI (US)

(72) Inventors: Irving L. Stackpole, Newport, RI (US); Richard Ashodian, Boston, MA (US)

(73) Assignee: Stackpole & Associates, Inc., Newport, RI (US)

( * ) Notice: Subject to any disclaimer, the term of this patent is extended or adjusted under 35 U.S.C. 154(b) by 0 days.

(21) Appl. No.: 16/514,808

(22) Filed: Jul. 17, 2019

Related U.S. Application Data

(63) Continuation-in-part of application No. 14/854,991, filed on Sep. 15, 2015.

(60) Provisional application No. 62/050,480, filed on Sep. 15, 2014.

(51) Int. Cl.
| | |
|---|---|
| *H04W 4/02* | (2018.01) |
| *H04W 4/029* | (2018.01) |
| *G06F 1/16* | (2006.01) |
| *H04M 1/725* | (2006.01) |
| *H04W 4/80* | (2018.01) |

(52) U.S. Cl.
CPC ............ *H04W 4/023* (2013.01); *G06F 1/163* (2013.01); *H04M 1/72572* (2013.01); *H04W 4/029* (2018.02); *H04W 4/80* (2018.02)

(58) Field of Classification Search
CPC ....... H04W 4/023; H04W 4/029; H04W 4/80; H04M 1/72572; G06F 1/163
See application file for complete search history.

(56) References Cited

U.S. PATENT DOCUMENTS

| | | |
|---|---|---|
| 2007/0192173 A1 | 8/2007 | Moughler |
| 2008/0005058 A1 | 1/2008 | Olander |
| 2008/0126126 A1 | 5/2008 | Ballai |
| 2008/0164998 A1 | 7/2008 | Scherpbier |
| 2011/0213634 A1 | 9/2011 | Karakey |
| 2013/0218583 A1 | 8/2013 | Marcolongo |
| 2014/0012591 A1 | 1/2014 | Kaboff |
| 2014/0278545 A1 | 9/2014 | Andrews |
| 2015/0269512 A1 | 9/2015 | Wartel |
| 2015/0327041 A1* | 11/2015 | Nishimura ............... H04W 4/70 455/418 |
| 2017/0280367 A1* | 9/2017 | Komati ................. H04W 36/30 |
| 2020/0045502 A1* | 2/2020 | Deluca ................. G06K 9/6267 |

* cited by examiner

*Primary Examiner* — Wayne H Cai
(74) *Attorney, Agent, or Firm* — Oblon, McClelland, Maier & Neustadt, L.L.P.

(57) ABSTRACT

A server and a corresponding method for communicating over a network with a first mobile device that is registered on the network and configured to transmit, via the network, positional data of the first mobile device to the server. The server including circuitry that outputs an instruction to a first mobile device, computes a time delay incurred in commencing the instruction, authenticates identifying information from the first mobile device, monitors a location of the first mobile device, to determine a displacement of the location of the first mobile device with respect to the location of a second mobile device, updates a factor based on data received by the server from the first and second mobile devices. The server further determines, based on the factor being lower than a predetermined factor threshold, a second instruction to be sent to the first mobile device.

20 Claims, 4 Drawing Sheets

ELECTRONIC RADIO FREQUENCY ID (RFID) TRACKER

FIELD OF INVENTION

The present disclosure relates generally to the field of monitoring. Specifically, aspects of the present disclosure relate to an apparatus and method thereof for electronic monitoring.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Currently there does not exist a mechanism of electronically monitoring and/or evaluating movement in large facilities, in order to measure behaviors within the large facilities, or to ensure that the instructions are being performed in a timely and efficient manner. Accordingly, there is a requirement for a technique of evaluating the efficiency and productivity in such facilities.

SUMMARY

An aspect of the present disclosure provides for a server. The server communicating over a network with a first mobile device that is registered on the network and configured to transmit, via the network, positional data of the first mobile device to the server, the server comprising circuitry configured to output an instruction to a first mobile device, compute a time delay incurred in commencing the instruction, authenticate identifying information from the first mobile device, monitor a location of the first mobile device, to determine a displacement of the location of the first mobile device with respect to the location of a second mobile device, update a factor based on at least one of an amount that the time delay exceeds a predetermined time delay threshold, the distance between the first mobile device and second mobile device, the amount of time the distance between the first mobile device and second mobile device is within the distance threshold, and a number of times the distance between the first mobile device and second mobile device is above the distance threshold. The circuitry is further configured to determine, based on the factor being lower than a predetermined factor threshold, a second instruction to be sent to the first mobile device, the second instruction being different than the first instruction.

According to another aspect of the present disclosure is provided a transitory or mobile device, which can be carried or worn by a user. This transitory device comprises circuitry configured to integrate with, and be responsive to other non-transitory devices and computers within the system, which mobile device transmits the location of, time delays, displacements of the location of the individual or objects to which the transitory device is fixed, allowing an update of activities and/or behaviors of the user via relayed signals to the non-transitory devices and computers within the system.

According to one aspect of the present disclosure is provided a method of communicating over a network with a first mobile device that is registered on the network and configured to transmit, via the network, positional data of the first mobile device to the server, the method comprising outputting, via the network, a first instruction to the first mobile device, selecting a second mobile device based on a positional proximity to the first mobile device being within a predetermined threshold proximity, receiving, via a first wireless transmission over the network, first identifying information transmitted by the first mobile device, receiving, via a second wireless transmission over the network, second identifying information transmitted by the second mobile device, selecting an identifying information set stored in a database based on the second identifying information; comparing the first identifying information with the identifying information set to authenticate the first identifying information, detecting commencement of the first instruction based on positional data transmitted from the first mobile device, the positional data being derived from Global Positioning Satellite ("GPS") data, Radio Frequency Identification ("RFID") data, Bluetooth data, or Near Field Communication ("NFC") data of the first mobile device, continuously monitoring a time delay between output of the first instruction to the first mobile device and commencement of the first instruction, continuously monitoring a positional relationship between the first mobile device and second mobile device, after determining that the first instruction has commenced, by comparing the positional data of the first mobile device with the positional data of the second mobile device, setting a distance threshold based on a number of mobile devices in a vicinity of the first mobile device, determining an amount of time that a distance between the first mobile device and second mobile device is within the distance threshold, updating a factor based on an amount that the time delay exceeds a predetermined time delay threshold, the distance between the first mobile device and second mobile device, the amount of time the distance between the first mobile device and second mobile device is within the distance threshold, and a number of times the distance between the first mobile device and second mobile device is above the distance threshold, determining, based on the factor being lower than a predetermined factor threshold, a second instruction to be sent to the first mobile device, the second instruction being different than the first instruction, and updating the database with additional information sets based on a plurality of second identifying information that are received over a predetermined amount of time, generating a report corresponding to the first instruction, the report including at least: the updated factor, the first instruction sent to the first mobile device, a number of times the time delay exceeds the time-delay threshold, and the amount of the time delay exceeds the predetermined time threshold.

According to another aspect of the present disclosure is provided a non-transitory computer readable medium storing thereon instructions that when executed by a computer cause the computer to execute a method of communicating over a network with a first mobile device that is registered on the network and configured to transmit, via the network, positional data of the first mobile device to the server, the method comprising outputting, via the network, a first instruction to the first mobile device, selecting a second mobile device based on a positional proximity to the first mobile device being within a predetermined threshold proximity, receiving, via a first wireless transmission over the network, first identifying information transmitted by the first mobile device, receiving, via a second wireless transmission over the network, second identifying information transmitted by the second mobile device, selecting an identifying information set stored in a database based on the second identifying information; comparing the first identifying information with the identifying information set to authenticate the first identifying information, detecting commencement of the first instruction based on positional data transmitted from the first mobile device, the positional data being derived from Global Positioning Satellite ("GPS") data, Radio Frequency Identification ("RFID") data, Bluetooth data, or Near Field Communication ("NFC") data of the first mobile device, continuously monitoring a time delay between output of the first instruction to the first mobile device and commencement of the first instruction, continuously monitoring a positional relationship between the first mobile device and second mobile device, after determining that the first instruction has commenced, by comparing the positional data of the first mobile device with the positional data of the second mobile device, setting a distance threshold based on a number of mobile devices in a vicinity of the first mobile device, determining an amount of time that a distance between the first mobile device and second mobile device is within the distance threshold, updating a factor based on an amount that the time delay exceeds a predetermined time delay threshold, the distance between the first mobile device and second mobile device, the amount of time the distance between the first mobile device and second mobile device is within the distance threshold, and a number of times the distance between the first mobile device and second mobile device is above the distance threshold, determining, based on the factor being lower than a predetermined factor threshold, a second instruction to be sent to the first mobile device, the second instruction being different than the first instruction, and updating the database with additional information sets based on a plurality of second identifying information that are received over a predetermined amount of time, generating a report corresponding to the first instruction, the report including at least: the updated factor, the first instruction sent to the first mobile device, a number of times the time delay exceeds the time-delay threshold, and the amount of the time delay exceeds the predetermined time threshold.

BRIEF DESCRIPTION OF THE DRAWINGS

Various embodiments of this disclosure that are provided as examples will be described in detail with reference to the following figures, wherein like numerals reference like elements, wherein.

DETAILED DESCRIPTION OF EMBODIMENTS

Figure 1:
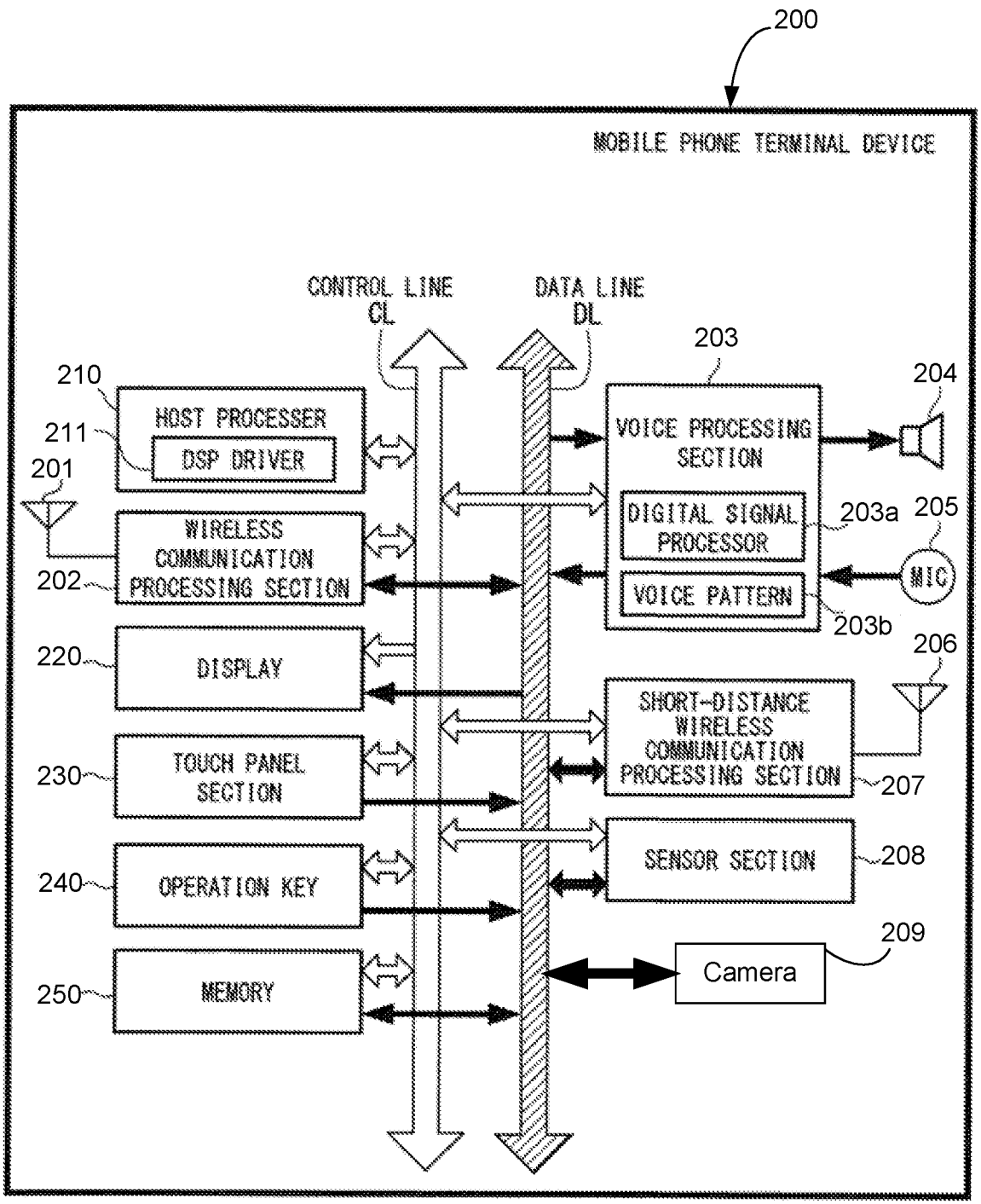
FIG. 1 illustrates schematically an exemplary mobile phone terminal device.

Exemplary embodiments are illustrated in the referenced figures of the drawings. It is intended that the embodiments and figures disclosed herein are to be considered illustrative rather than restrictive. No limitation on the scope of the technology and of the claims that follow is to be imputed to the examples shown in the drawings and discussed herein.

The embodiments are mainly described in terms of particular processes and systems provided in particular implementations. However, the processes and systems will operate effectively in other implementations. Phrases such as "an embodiment", "one embodiment" and "another embodiment" may refer to the same or different embodiments. The embodiments will be described with respect to methods and compositions having certain components. However, the methods and compositions may include more or less components than those shown, and variations in the arrangement and type of the components may be made without departing from the scope of the present disclosure.

The exemplary embodiments are described in the context of methods having certain steps. However, the methods and compositions operate effectively with additional steps and steps in different orders that are not inconsistent with the exemplary embodiments. Thus, the present disclosure is not intended to be limited to the embodiments shown, but is to be accorded the widest scope consistent with the principles and features described herein and as limited only by appended claims.

Furthermore, where a range of values is provided, it is to be understood that each intervening value between an upper and lower limit of the range—and any other stated or intervening value in that stated range is encompassed within the disclosure. Where the stated range includes upper and lower limits, ranges excluding either of those limits are also included. Unless expressly stated, the terms used herein are intended to have the plain and ordinary meaning as understood by those of ordinary skill in the art. The following definitions are intended to aid the reader in understanding the present disclosure, but are not intended to vary or otherwise limit the meaning of such terms unless specifically indicated.

Turning to the figures, a server monitors the instructions outputted to a mobile device, and further evaluates a performance factor for each instruction based on the data obtained from the monitoring. The server may also incorporate an inspection process in order to authenticate whether a particular user is in fact performing or has performed the instruction. In doing so, the server monitors the mobile devices to determine the occurrence of an unauthenticated user.

By one embodiment, the portable mobile device is an RFID badge. The RFID badge enables tracking and identification of the user, and an RFID chip that enables the RFID badge to communicate with the server. The portable mobile device may be a portable mobile device as described in U.S. Ser. No. 14/854,991, the entire contents of which are incorporated herein by reference in entirety.

The RFID badge may be passive, active or battery-assisted passive. An active tag includes an on-board battery and periodically transmits its ID signal. A battery-assisted passive (BAP) tag has a small battery on board and is activated when in the presence of an RFID reader. It must be appreciated that a passive tag is cheaper and smaller because it has no battery and instead uses the radio energy transmitted by the reader.

Furthermore, the RFID badge can include at least an integrated circuit for storing and processing information, modulating and demodulating a radio-frequency (RF) signal, collecting DC power from the incident reader signal, and other specialized functions. The RFID badge may further include an antenna for receiving and transmitting signals. The badge information is stored in a non-volatile memory. The RFID chip further includes either fixed or programmable logic for processing the transmission and sensor data, respectively.

By one embodiment, the server includes a plurality of RFID readers (scanners) that are disposed in different locations. The readers communicate with the RFID badges and detect the movement of the RFID badges. For instance, the RFID readers may transmit an encoded radio signal to interrogate the RFID badge. The RFID badge upon receiving the message (from the reader), responds with its identification and other information. Note that since the RFID badges have individual serial numbers (e.g., barcodes), the RFID system can discriminate among several badges that might be within the range of the RFID reader and read them simultaneously.

Furthermore, the various RFID readers may communicate with the server 101 using wireless communication, Bluetooth techniques and the like, to report the information obtained from the RFID badges. According to one embodiment, the server monitors the movement of the RFID badges and is configured to generate a spaghetti diagram illustrating the movement of the RFID badges.

By one embodiment, portable mobile devices share collected monitoring data with the server via a network. The mobile devices may include Global Positioning Satellite (GPS) transceivers and software configured to communicate GPS radio signals that are processed by the server. Accordingly, the server may monitor the locations of the mobile devices based on the received GPS signals. The mobile devices may also be configured to determine global coordinates, e.g., latitude, longitude and altitude, as well as real time information and transmit such information to the server. Each of the mobile devices may include a processor and sufficient memory having stored therein one or more sets of instructions, e.g., in the form of a user application or app, executable by the processor to guide a user through a daily activity regimen.

Examples of mobile devices include, but are not be limited to, smart phones, personal communication devices (PDAs), application-specific mobile electronic devices and/or other mobile electronic devices having sufficient memory and computing power to execute or display a set of instructions, and configured to pass collected monitoring data to the server via the network.

Figure 4:
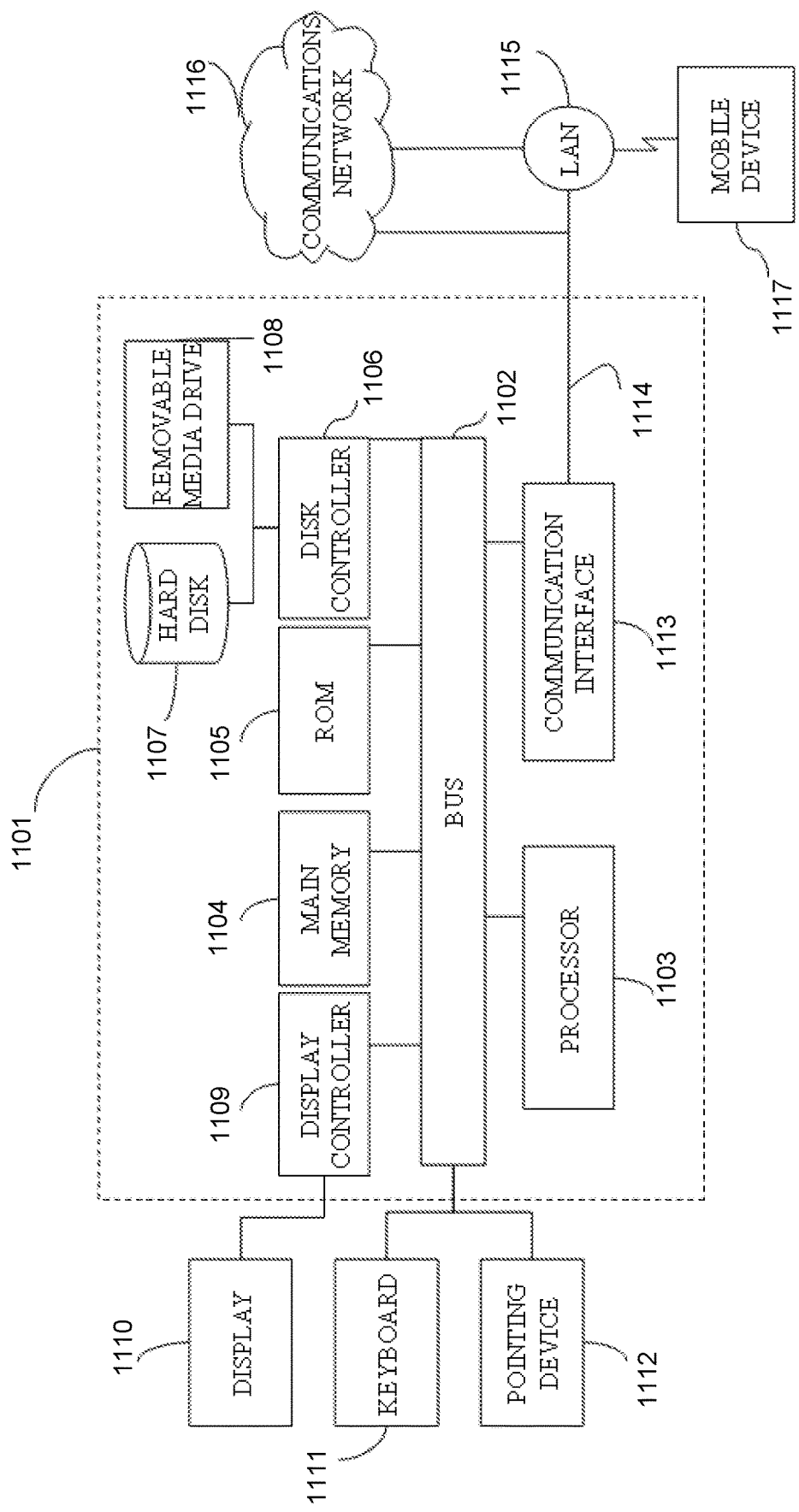
FIG. 4 illustrates a block diagram of a computing device according to one embodiment.

Furthermore, the mobile devices may each also include a camera that is configured to take standstill (images) as well as moving pictures (video) and transmit the captured video and image data to the server, via a transmitter. Each mobile device may also be configured to time-stamp the captured images and/or videos, as well as any other data, by using a built-in timer. Specific hardware capabilities and the functionalities of the mobile device are described next with reference to FIG. 1. Furthermore, each of the mobile devices may include the configuration as shown in FIG. 4.

FIG. 1 illustrates a schematic block diagram of an exemplary mobile phone terminal device 200. As shown in FIG. 1, the mobile phone terminal device 200 may include an antenna 201 and a wireless communication processing section 202. The wireless communication processing section 202 may communicate wirelessly via radio signals, or the like, with other mobile devices via a base station. Additionally, the mobile phone terminal 200 may communicate with the server via the network. Further, a data signal, such as a voice transmission from another user, may be received by antenna 201 and sent to the wireless communication processing section 202 for further processing. In the case of an incoming voice transmission, the voice data signal may be sent from the wireless communication processing section 202 to a voice processing section 203. Incoming voice data received by the voice processing section 203 via the wireless communication processing section 202 may be output as sound via a speaker 204.

Conversely, an outgoing voice signal may be supplied by a user to the voice processing section 203 via a microphone 205. The voice signal received via microphone 205 and processed by the voice processing section 203 may be sent to wireless communication processing section 202 for transmission by the antenna 201. The voice processing section 203 comprises a digital signal processor (DSP) 203a which digitizes the incoming analog signal and processes the audio input to detect for keywords. Keywords enable the operation of device 200, when it is configured to operate under the instructions of specific voice commands. These keywords are preset in the device with the aid of a voice registration unit and stored in the voice pattern library 203b.

A second antenna 206 may be supplied for use with a short distance wireless communication processing section 207. The short distance wireless communication processing section 207 may communicate wirelessly with other devices over a network, such as the Internet, a local area network (LAN), or a wide area network (WAN). The second antenna 206 may, e.g., by a Wi-Fi or a Bluetooth transceiver.

A sensor section 208 may be provided for the mobile phone terminal device 200. The sensor section 208 may be a motion sensor that detects a motion of an object in the proximity of the mobile phone terminal device 200. The motion may correspond to a user moving an instruction object, such as a finger or stylus, in the proximity of the mobile phone terminal device 200 for the purpose of selecting data displayed on display 220. Additionally, instructions transmitted from the server may be displayed on the display panel 220 of the mobile phone terminal 200. The sensor section 208 may include a GPS tracker that enables the location of the mobile device 200 to be determined and monitored by the server. Furthermore, the mobile phone terminal device 200 may include a camera 209 that is configured to acquire and display captured images and/or video on the display 220 of the mobile device 200.

The display 220 may be, for example a liquid crystal display (LCD) panel, an organic electroluminescent (OLED) display panel, a plasma display panel, or the like. The display 220 may display text, an image, a web page, a video, or the like. For example, when the mobile phone terminal device 200 connects with the Internet, the display 220 may display text and/or image data which is transmitted from a web server in Hyper Text Markup Language (HTML) format and displayed via a web browser. The display 220 may additionally display data stored in a memory 250.

A touch panel section 230 can detect a touch operation on the surface of the display 220. For example the touch panel 230 can detect a touch operation performed by an instruction object such as a finger or stylus. Touch operations may correspond to user inputs such as a selection of an icon or a character string displayed on the display 220. The touch panel section 230 may be an electrostatic capacitance type device, a resistive type touch panel device, or other such type devices for detecting a touch on a display panel.

The touch panel section 230 may perform processing related to touch operation classification. For example, the touch panel section 230 may assign a predetermined function to be performed when a "tap" touch operation is detected. Similarly, the touch panel section may analyze a touch operation in which the instruction object makes continuous contact with the display 220, while moving the instruction object around the display 220 (e.g., a "swipe" operation). The touch panel section 230 may output a signal based on a classification of the touch operation performed. The signal may for example, include information indicating the touch operation classification, the location on the display 220 where the touch operation was performed, and the operation to be performed based on the touch operation.

Data which is detected and processed by the touch panel 230 can be transmitted to a host controller 210. The host controller/processor 210 (processing circuitry) may include one or more processor units (circuits) and can control each element of the mobile phone terminal device 200 based on data detected by the touch panel 230, or by inputs received from operation key 240. The operation key 240 may receive inputs, e.g., from external control buttons included with the mobile phone terminal device 200. The external control buttons may for example control the volume, the power, or a hold operation for the mobile phone terminal device 200.

The host controller 210 may further execute instructions stored in the memory 250. The controller may further comprise of a DSP driver 211, which is configured to communicate with the DSP 203a. Specifically, the driver may actuate the DSP during a voice registering phase, or the DSP 203a may initiate communication with the driver upon the successful detection of a voice command. The driver 211 may further activate the host processor to execute a certain application based on the received voice commands. To this end, the memory 250 may be a non-transitory computer readable medium having instructions stored therein for controlling the mobile phone terminal device 200. Further, the controller 210 may include one or more processors for executing the instructions stored on the memory 250.

The mobile phone terminal device 200 can include a control line CL and a data line DL as internal bus lines for communication. The control line CL can be used to transmit control data from the controller 210. The data line DL may be used for the transmission of voice data, display data, or the like, throughout the various elements of the mobile phone terminal device 200.

Figure 2:
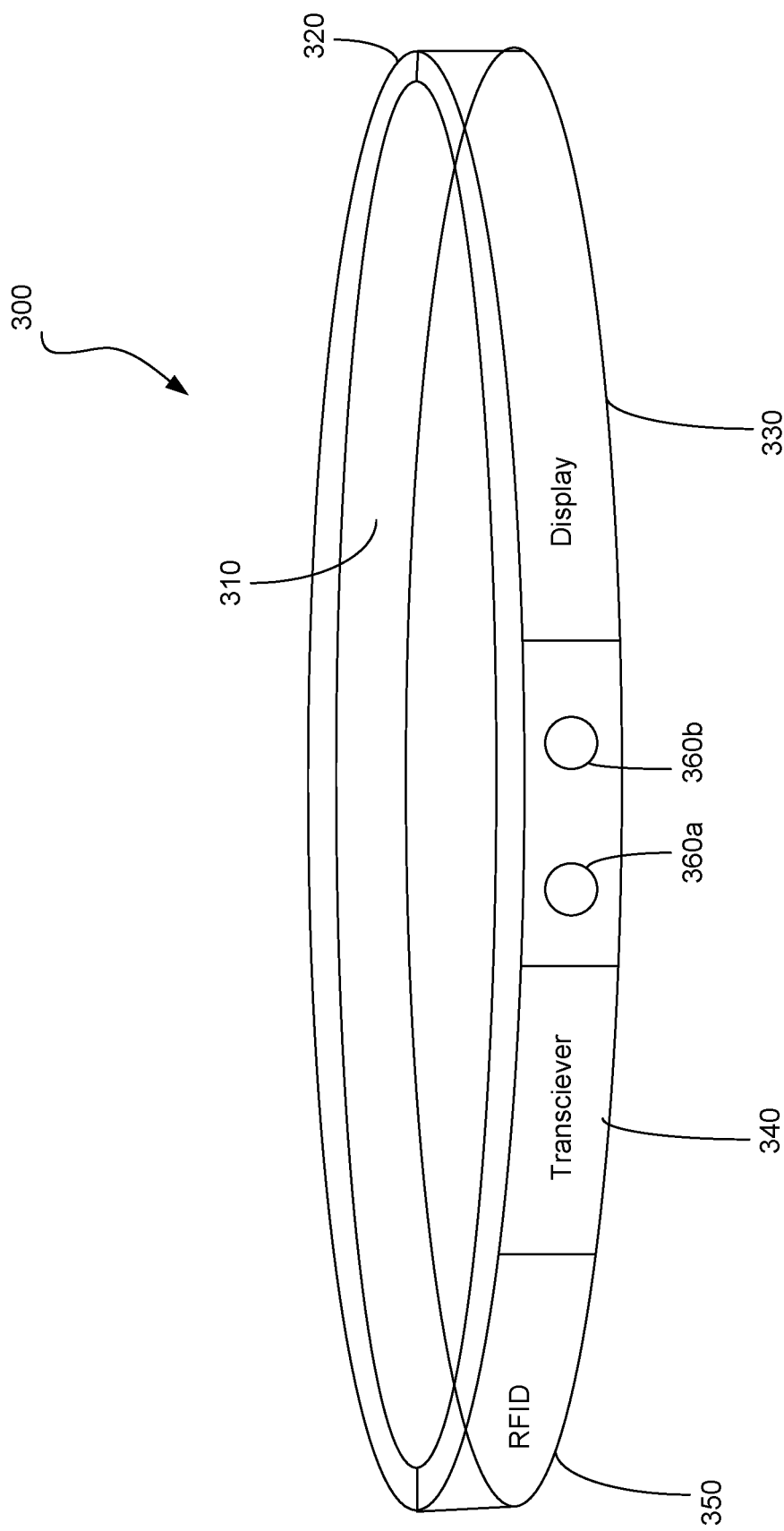
FIG. 2 depicts an exemplary wrist band.

FIG. 2 depicts, according to an embodiment, an exemplary wrist band 300.

The wrist-band 300 includes an inner surface 310 (located proximate to a user's wrist, when the wrist-band 300 is worn) and an outer surface 320, in which a display 330 is embedded or otherwise located such that the display is visible to the user when the wrist-band 300 is worn. The wrist-band 300 can be utilized, for instance, to extend the functionality of a personal electronic device. For example, the wristband 300 may wirelessly communicate with a mobile phone or other electronic device using Bluetooth, Near Field Communication (NFC), or other means of wireless communication. Alternatively, the wristband 300 may be a stand-alone device that provides some or all of the functionality described herein, independent of whether the wrist-band 300 is actively communicating with a personal electronic device.

The display 330 of the multi-function wrist-band may be, for example a liquid crystal display (LCD) panel, an organic electroluminescent (OLED) display panel, a plasma display panel, or the like. The display 330 may display text, an image, a web page, a video, or the like. For example, when the wristband 300 connects with the Internet, the display 330 may display text and/or image data, which is transmitted from a web server in Hyper Text Markup Language (HTML) format and displayed via a web browser. The display 330 may additionally display data stored in a memory module that is included in the wrist-band 300.

Further, the wrist-band 300 includes a transceiver 340 that enables the wrist-band to communicate with the server. Specifically, the transceiver 340 includes a receiver portion and a transmitter portion, with some circuitry that may be shared between the receiver and transmitter portions, respectively. In the receiver portion of the transceiver 340, signals may be received on an antenna and processed through a front end that includes a filter and low noise amplifier circuitry. According to an embodiment, the transceiver 340 may be configured to communicate using the GSM 900 (Global System for Mobile) frequency band (925-960 MHz), or the DCS 1800 (Digital Cellular System) frequency band of 1805 to 1880 MHz. However, it must be appreciated that the transceiver 340 may be used with different combinations of frequency bands.

The wrist-band 300 includes radio frequency identification (RFID) tag 350. Each RFID tag is unique and can be used to identify a particular wrist-band. According to an embodiment, the RFID tag may be a surface acoustic wave (SAW) RFID tag that is made of materials that have piezoelectric characteristics. The RFID tag 350 may include a dipole antenna that is configured to communicate with a reader by transmission/reception of electromagnetic radio frequency signals.

The wrist band 300 further includes two push buttons 360a and 360b that a user can utilize to report the performance of the instruction to the server. Furthermore, by one embodiment, it must be appreciated that the functionality of the push buttons 360a and 360b may be achieved by displaying two corresponding icons on the display panel 330 of the wrist band 300.

The wristband 300 may be made from a fireproof, unbreakable, and/or waterproof material. The wristband includes a processor (e.g., microcontroller) operatively coupled to a memory, a Global Positioning System (GPS) chipset and antenna to transmit and receive signals from the server 101, a battery and a back-up power module (e.g., solar cells) The processor may communicate with a display controller, RFID controller, and transceiver controller, by transmitting control signals to operate/control the functioning of the display, RFID tag, antennas and the like.

The battery provides primary operational power to the wristband, including the processor and the GPS chipset. The back-up power module provides secondary operational power to the wrist-band. The battery provides enough power to operate the wrist-band for several hours. The memory included in the wristband 300 includes a driver/program module and programmed data module. The program module includes computer-program instructions executable by the processor to implement features of the wristband. The program data module may be configured to store information pertaining to the wristband such as the unique RFID tag information, transmission data related to, for instance longitude and latitude coordinates of the location of the wristband and the like.

Figure 3:
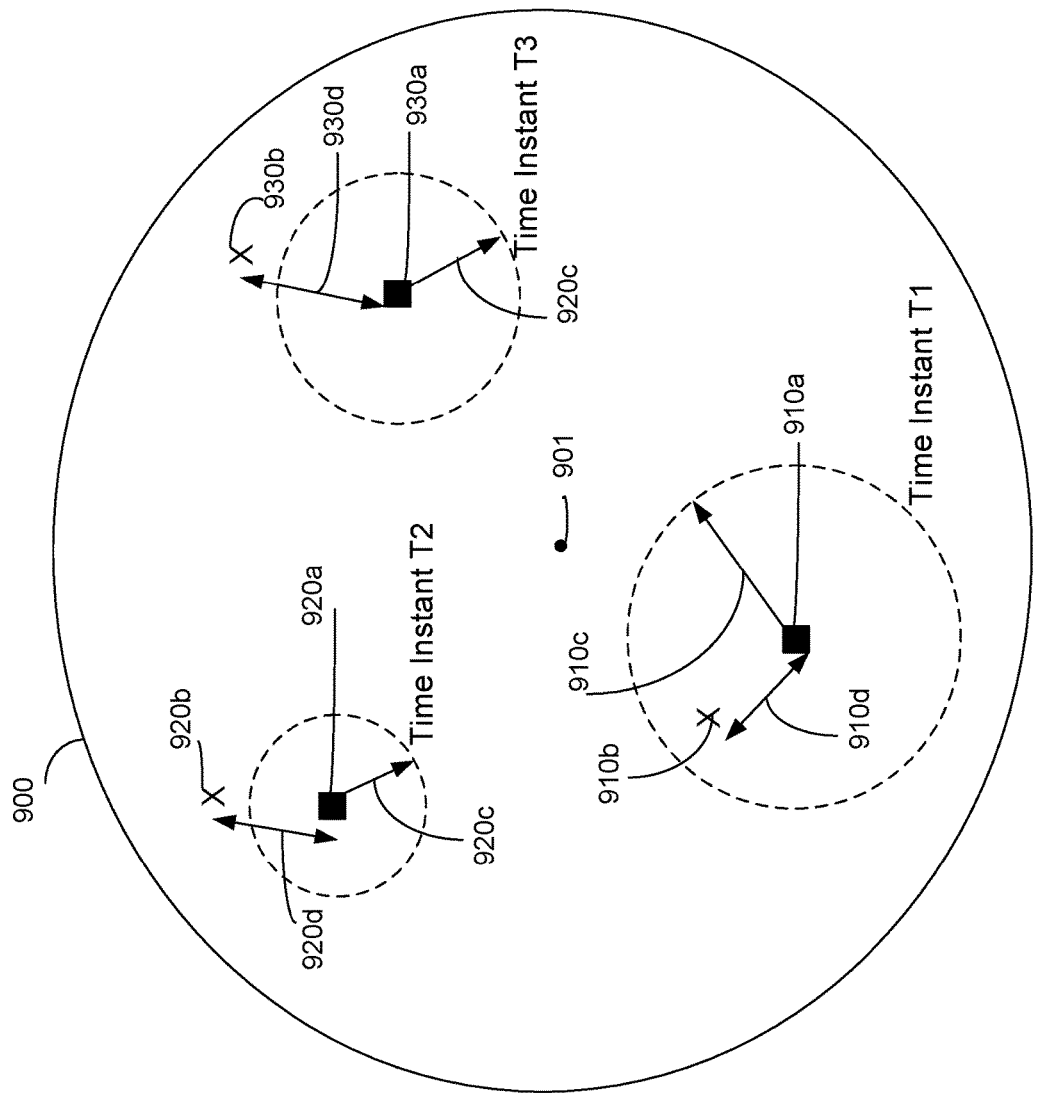
FIG. 3 illustrates an exemplary server monitoring scenario.

FIG. 3 illustrates an exemplary server monitoring scenario according to one embodiment of the present disclosure.

As shown in FIG. 3, a first geographical region is represented as a circular region 900 having a center represented as 901. Further, the location of the a second mobile device (that is detected via GPS signals transmitted by the second mobile device (e.g. a wristband 300)) at three distinct time instances is depicted by squares 910a, 920a, and 930a, respectively. Similarly, the locations of the mobile device at the three distinct time instances is depicted by the marks 'X', represented as 910b, 920b, and 930b, respectively. Based on the detected positions of the second mobile device and the mobile device, the server computes a displacement of the detected location of the first mobile device with respect to the detected location of the second mobile device. Specifically, as shown in FIG. 3, the displacments at the three distinct time instances is represented as 910d, 920d, and 930d, respectively.

By one embodiment, the server continuously monitors the locations of a first mobile device and a second mobile device. Further, the server determines whether the computed displacement between the detected positions is greater than a predetemrined threshold. Specifically, consider the first time instance (T1) having the detected position of first mobile device being represented as 910*a* and the detected position of the second mobile device being represented as 910*b*. The server determines whether the computed displacement 910*d* is greater than a predetermined distance threshold represented as 910*c*. In other words, at each time instant, the server determines whether the first mobile device is located within a predetermined area centered at the detected location of the second mobile device, wherein the predetermined area has a radius that is equal to the threshold distance. Similarly, as time instances T2 and T3, the server determines whether the computed displacments 920*d* and 930*d* respectively, are greater than the predetermined distance thresholds 920*c* and 930*c*, respectively.

It must be appreciated that the server may employ different distance thresholds at different time instances. In contrast, the server may employ the same distance thresholds for all time instances.

As shown in FIG. 3, the server monitors the position of the first mobile device and determines a number of times the first mobile device is displaced greater (time instances T2 and T3) than the distance threshold from the location of the second mobile device. Further, the server may penalize the overall factor based on the determined number of times the first mobile device is located farther than the distance threshold from the second mobile device. In addition, by one embodiment, the server may determine an amount of time the first mobile device is displaced farther than the distance threshold, and accordingly, the server may penalize the overall factor.

Furthermore, the embodiments described above are in no manner limiting the scope of the present disclosure. Other equivalent techniques of performing the functionalities of the above described embodiments are well within the scope of the present disclosure. For instance, the server may monitor and track the locations of the mobile devices via a WiFi network. Additionally, devices such as Apple watch, Fit Bit, or any other exercise bands that have Bluetooth, and/or WiFi capabilities can be used as mobile devices.

Each of the functions of the described embodiments may be implemented by one or more processing circuits. A processing circuit includes a programmed processor (for example, processor 1103 in FIG. 4), as a processor includes circuitry. A processing circuit also includes devices such as an application-specific integrated circuit (ASIC) and circuit components arranged to perform the recited functions.

The various features discussed above may be implemented by a computer system (or programmable logic). FIG. 4 illustrates such a computer system 1101. As noted above, each of the devices 101, 106, 107, 108, and 300 may have a configuration as shown in FIG. 4. In one embodiment, the computer system 1101 is a particular, special-purpose machine when the processor 1103 is programmed to perform monitoring, authentication and evaluation processes.

The computer system 1101 includes a disk controller 1106 coupled to the bus 1102 to control one or more storage devices for storing information and instructions, such as a magnetic hard disk 1107, and a removable media drive 1108 (e.g., floppy disk drive, read-only compact disc drive, read/write compact disc drive, compact disc jukebox, tape drive, and removable magneto-optical drive). The storage devices may be added to the computer system 1101 using an appropriate device interface (e.g., small computer system interface (SCSI), integrated device electronics (IDE), enhanced-IDE (E-IDE), direct memory access (DMA), or ultra-DMA).

The computer system 1101 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1101 may also include a display controller 1109 coupled to the bus 1102 to control a display 1110, for displaying information to a computer user. The computer system includes input devices, such as a keyboard 1111 and a pointing device 1112, for interacting with a computer user and providing information to the processor 1103. The pointing device 1112, for example, may be a mouse, a trackball, a finger for a touch screen sensor, or a pointing stick for communicating direction information and command selections to the processor 1103 and for controlling cursor movement on the display 1110.

The processor 1103 executes one or more sequences of one or more instructions contained in a memory, such as the main memory 1104. Such instructions may be read into the main memory 1104 from another computer readable medium, such as a hard disk 1107 or a removable media drive 1108. One or more processors in a multi-processing arrangement may also be employed to execute the sequences of instructions contained in main memory 1104. In alternative embodiments, hard-wired circuitry may be used in place of or in combination with software instructions. Thus, embodiments are not limited to any specific combination of hardware circuitry and software.

As stated above, the computer system 1101 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1101, for driving a device or devices for implementing the invention, and for enabling the computer system 1101 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1103 for execution. A computer readable medium may take many forms, including but not limited to, non-volatile media or volatile media.

Non-volatile media includes, for example, optical, magnetic disks, and magneto-optical disks, such as the hard disk 1107 or the removable media drive 1108. Volatile media includes dynamic memory, such as the main memory 1104. Transmission media, on the contrary, includes coaxial cables, copper wire and fiber optics, including the wires that make up the bus 1102. Transmission media also may also take the form of acoustic or light waves, such as those generated during radio wave and infrared data communications.

Various forms of computer readable media may be involved in carrying out one or more sequences of one or more instructions to processor 1103 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1101 may receive the data on the telephone line and place the data on the bus 1102. The bus 1102 carries the data to the main memory 1104, from which the processor 1103 retrieves and executes the instructions. The instructions received by the main memory 1104 may optionally be stored on storage device 1107 or 1108 either before or after execution by processor 1103.

The computer system 1101 also includes a communication interface 1113 coupled to the bus 1102. The communication interface 1113 provides a two-way data communication coupling to a network link 1114 that is connected to, for example, a local area network (LAN) 1115, or to another communications network 1116 such as the Internet. For example, the communication interface 1113 may be a network interface card to attach to any packet switched LAN. As another example, the communication interface 1113 may be an integrated services digital network (ISDN) card. Wireless links may also be implemented. In any such implementation, the communication interface 1113 sends and receives electrical, electromagnetic or optical signals that carry digital data streams representing various types of information.

The network link 1114 typically provides data communication through one or more networks to other data devices. For example, the network link 1114 may provide a connection to another computer through a local network 1115 (e.g., a LAN) or through equipment operated by a service provider, which provides communication services through a communications network 1116. The local network 1114 and the communications network 1116 use, for example, electrical, electromagnetic, or optical signals that carry digital data streams, and the associated physical layer (e.g., CAT 5 cable, coaxial cable, optical fiber, etc.). The signals through the various networks and the signals on the network link 1114 and through the communication interface 1113, which carry the digital data to and from the computer system 1101 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1101 can transmit and receive data, including program code, through the network(s) 1115 and 1116, the network link 1114 and the communication interface 1113. Moreover, the network link 1114 may provide a connection through a LAN 1115 to a mobile device 1117 such as a personal digital assistant (PDA) laptop computer, or cellular telephone. Specifically, the mobile devices may connect to the network using wireless, Bluetooth, WiFi and the like connectivity techniques.

While aspects of the present disclosure have been described in conjunction with the specific embodiments thereof that are proposed as examples, alternatives, modifications, and variations to the examples may be made. Furthermore, the above disclosure also encompasses the embodiments noted below. It should be noted that, as used in the specification and the appended claims, the singular forms "a," "an," and "the" include plural referents unless the context clearly dictates otherwise.

What is claimed is:

1. A server communicating over a network with a first mobile device that is registered on the network and configured to transmit, via the network, positional data of the first mobile device to the server, the server comprising
circuitry configured to
output, via the network, a first instruction to the first mobile device,
select a second mobile device based on a positional proximity to the first mobile device being within a predetermined threshold proximity,
receive, via a first wireless transmission over the network, first identifying information transmitted by the first mobile device,
receive, via a second wireless transmission over the network, second identifying information transmitted by the second mobile device,
select an identifying information set stored in a database based on the second identifying information;
compare the first identifying information with the identifying information set to authenticate the first identifying information,
detect commencement of the first instruction based on positional data transmitted from the first mobile device, the positional data being derived from Global Positioning Satellite ("GPS") data, Radio Frequency Identification ("RFID") data, Bluetooth data, or Near Field Communication ("NFC") data of the first mobile device,
continuously monitor a time delay between output of the first instruction to the first mobile device and commencement of the first instruction,
continuously monitor a positional relationship between the first mobile device and second mobile device, after determining that the first instruction has commenced, by comparing the positional data of the first mobile device with the positional data of the second mobile device,
set a distance threshold based on a number of mobile devices in a vicinity of the first mobile device,
determine an amount of time that a distance between the first mobile device and second mobile device is within the distance threshold,
update a factor based on an amount that the time delay exceeds a predetermined time delay threshold, the distance between the first mobile device and second mobile device, the amount of time the distance between the first mobile device and second mobile device is within the distance threshold, and a number of times the distance between the first mobile device and second mobile device is above the distance threshold, determine, based on the factor being lower than a predetermined factor threshold, a second instruction to be sent to the first mobile device, the second instruction being different than the first instruction, and update the database with additional information sets based on a plurality of second identifying information that are received over a predetermined amount of time, generate a report corresponding to the first instruction, the report including at least: the updated factor, the first instruction sent to the first mobile device, a number of times the time delay exceeds the time-delay threshold, and the amount of the time delay exceeds the predetermined time threshold.

2. The server of claim 1, wherein the circuitry is further configured to
initiate the comparing of the first identifying information with the identifying information set based on at least one of the factor being lower than a predetermined factor threshold, and a number of generated reports corresponding to the first instruction.

3. The server of claim 2, wherein the circuitry is further configured to authenticate the first identifying information based on an image received from the first mobile device, the image being one of: a first user of the first mobile device, and an image of the first user of the first mobile device and a second user associated with the first instruction.

4. The server of claim 1, wherein the circuitry is configured to determine the time delay between output of the instruction to the first mobile device and commencement of the instruction based on a comparison of a time-stamp associated with receiving the first identifying information and a predetermined time at which the first instruction is anticipated to be commenced.

5. The server of claim 1, wherein the circuitry is further configured to
determine the time-delay threshold based on a type of the first instruction, and
adjust the time-delay threshold based on a time of day the instruction is to be performed.

6. The server of claim 1, wherein the circuitry is further configured to
determine the location of the first mobile device based on the positional data of the first mobile device,
output, via the network, the second instruction to a third mobile device, based on a location of the first mobile device at completion of the first instruction, an anticipated location at which the second instruction is to be completed, and an estimated travel time between the anticipated location from the location of the first mobile device, and
update the factor based on a total number of instructions associated with the first mobile device are output to the third mobile device.

7. The server of claim 1, wherein the circuitry is further configured to
transmit information associated with the first identifying information, to be displayed on a display panel of the second mobile device.

8. The server of claim 1, wherein the circuitry is configured to
generate a spaghetti chart including trajectories that correspond to movement of the second mobile device over a predetermined time period, and
transmit an alarm signal based on the trajectory of the second mobile device being within an unauthorized zone.

9. The server of claim 1, wherein the first mobile device and the second mobile device is one of a cell-phone, an RFID badge, and a wrist-band.

10. The server of claim 1, wherein the circuitry is further configured to
initialize the factor to a maximum predetermined factor,
monitor, at predetermined time instances, a location of the first mobile device and a the second mobile device,
compute for each time instance, a safe area based on the monitored location of the second mobile device, the safe area being a circular area having a radius equal to the distance threshold,
determine for each computed safe area corresponding to each time instance, whether the monitored location of the first mobile device is within the safe area,
calculate, based on the determining, a number of times the location of the first mobile device is outside the respective safe areas,
transmit an alarm signal based on the calculated number of times the first mobile device is outside the respective safe areas exceeding a predetermined threshold, and
update the factor based on the amount of the time delay exceeding a predetermined time threshold, the distance between the first mobile device and second mobile device, the amount of time the distance between the first mobile device and second mobile device is within the distance threshold, the number of times the distance between the first mobile device and second mobile device is above the distance threshold, and the calculated number of times the monitored location of the first mobile device is outside the respective safe areas.

11. A method of communicating over a network with a first mobile device that is registered on the network and configured to transmit, via the network, positional data of the first mobile device to the server, the method comprising
outputting, via the network, a first instruction to the first mobile device,
selecting a second mobile device based on a positional proximity to the first mobile device being within a predetermined threshold proximity,
receiving, via a first wireless transmission over the network, first identifying information transmitted by the first mobile device,
receiving, via a second wireless transmission over the network, second identifying information transmitted by the second mobile device,
selecting an identifying information set stored in a database based on the second identifying information;
comparing the first identifying information with the identifying information set to authenticate the first identifying information,
detecting commencement of the first instruction based on positional data transmitted from the first mobile device, the positional data being derived from Global Positioning Satellite ("GPS") data, Radio Frequency Identification ("RFID") data, Bluetooth data, or Near Field Communication ("NFC") data of the first mobile device,
continuously monitoring a time delay between output of the first instruction to the first mobile device and commencement of the first instruction, continuously monitoring a positional relationship between the first mobile device and second mobile device, after determining that the first instruction has commenced, by comparing the positional data of the first mobile device with the positional data of the second mobile device, setting a distance threshold based on a number of mobile devices in a vicinity of the first mobile device, determining an amount of time that a distance between the first mobile device and second mobile device is within the distance threshold, updating a factor based on an amount that the time delay exceeds a predetermined time delay threshold, the distance between the first mobile device and second mobile device, the amount of time the distance between the first mobile device and second mobile device is within the distance threshold, and a number of times the distance between the first mobile device and second mobile device is above the distance threshold, determining, based on the factor being lower than a predetermined factor threshold, a second instruction to be sent to the first mobile device, the second instruction being different than the first instruction, and updating the database with additional information sets based on a plurality of second identifying information that are received over a predetermined amount of time, generating a report corresponding to the first instruction, the report including at least: the updated factor, the first instruction sent to the first mobile device, a number of times the time delay exceeds the time-delay threshold, and the amount of the time delay exceeds the predetermined time threshold.

12. The method of claim 11, further comprising
initiating the comparing of the first identifying information with the identifying information set based on at least one of the factor being lower than a predetermined factor threshold, and a number of generated reports corresponding to the first instruction.

13. The method of claim 12, further comprising
authenticating the first identifying information based on an image received from the first mobile device, the image being one of: a first user of the first mobile device, and an image of the first user of the first mobile device and a second user associated with the first instruction.

14. The method of claim 11, further comprising
determining the time delay between output of the instruction to the first mobile device and commencement of the instruction based on a comparison of a time-stamp associated with receiving the first identifying information and a predetermined time at which the first instruction is anticipated to be commenced.

15. The method of claim 11, further comprising
determining the time-delay threshold based on a type of the first instruction, and
adjusting the time-delay threshold based on a time of day the instruction is to be performed.

16. The method of claim 11, further comprising
determining the location of the first mobile device based on the positional data of the first mobile device,
outputting, via the network, the second instruction to a third mobile device, based on a location of the first mobile device at completion of the first instruction, an anticipated location at which the second instruction is to be completed, and an estimated travel time between the anticipated location from the location of the first mobile device, and updating the factor based on a total number of instructions associated with the first mobile device are output to the third mobile device.

17. The method of claim 11, further comprising
transmitting information associated with the first identifying information, to be displayed on a display panel of the second mobile device.

18. The method of claim 11, further comprising
generating a spaghetti chart including trajectories that correspond to movement of the second mobile device over a predetermined time period, and
transmitting an alarm signal based on the trajectory of the second mobile device being within an unauthorized zone.

19. The method of claim 11, further comprising
initializing the factor to a maximum predetermined factor,
monitoring, at predetermined time instances, a location of the first mobile device and a the second mobile device,
computing for each time instance, a safe area based on the monitored location of the second mobile device, the safe area being a circular area having a radius equal to the distance threshold,
determining for each computed safe area corresponding to each time instance, whether the monitored location of the first mobile device is within the safe area,
calculating, based on the determining, a number of times the location of the first mobile device is outside the respective safe areas,
transmitting an alarm signal based on the calculated number of times the first mobile device is outside the respective safe areas exceeding a predetermined threshold, and
updating the factor based on the amount of the time delay exceeding a predetermined time threshold, the distance between the first mobile device and second mobile device, the amount of time the distance between the first mobile device and second mobile device is within the distance threshold, the number of times the distance between the first mobile device and second mobile device is above the distance threshold, and the calculated number of times the monitored location of the first mobile device is outside the respective safe areas.

20. A non-transitory computer readable medium storing thereon instructions that when executed by a computer cause the computer to execute a method of communicating over a network with a first mobile device that is registered on the network and configured to transmit, via the network, positional data of the first mobile device to the server, the method comprising
outputting, via the network, a first instruction to the first mobile device,
selecting a second mobile device based on a positional proximity to the first mobile device being within a predetermined threshold proximity,
receiving, via a first wireless transmission over the network, first identifying information transmitted by the first mobile device,
receiving, via a second wireless transmission over the network, second identifying information transmitted by the second mobile device,
selecting an identifying information set stored in a database based on the second identifying information;
comparing the first identifying information with the identifying information set to authenticate the first identifying information,
detecting commencement of the first instruction based on positional data transmitted from the first mobile device, the positional data being derived from Global Positioning Satellite ("GPS") data, Radio Frequency Identification ("RFID") data, Bluetooth data, or Near Field Communication ("NFC") data of the first mobile device, continuously monitoring a time delay between output of the first instruction to the first mobile device and commencement of the first instruction, continuously monitoring a positional relationship between the first mobile device and second mobile device, after determining that the first instruction has commenced, by comparing the positional data of the first mobile device with the positional data of the second mobile device, setting a distance threshold based on a number of mobile devices in a vicinity of the first mobile device, determining an amount of time that a distance between the first mobile device and second mobile device is within the distance threshold, updating a factor based on an amount that the time delay exceeds a predetermined time delay threshold, the distance between the first mobile device and second mobile device, the amount of time the distance between the first mobile device and second mobile device is within the distance threshold, and a number of times the distance between the first mobile device and second mobile device is above the distance threshold, determining, based on the factor being lower than a predetermined factor threshold, a second instruction to be sent to the first mobile device, the second instruction being different than the first instruction, and updating the database with additional information sets based on a plurality of second identifying information that are received over a predetermined amount of time, generating a report corresponding to the first instruction, the report including at least: the updated factor, the first instruction sent to the first mobile device, a number of times the time delay exceeds the time-delay threshold, and the amount of the time delay exceeds the predetermined time threshold.

* * * * *